United States Patent [19]

Iyengar

[11] Patent Number: 4,469,519
[45] Date of Patent: Sep. 4, 1984

[54] SOFT TEXTURED HIGH STRENGTH ALKALI BLUE PIGMENT

[75] Inventor: Doreswamy R. Iyengar, Holland, Mich.

[73] Assignee: BASF Wyandotte Corporation, Wyandotte, Mich.

[21] Appl. No.: 441,039

[22] Filed: Nov. 12, 1982

[51] Int. Cl.³ .............................................. C09B 67/06
[52] U.S. Cl. ........................... 106/288 Q; 106/308 Q; 106/308 M
[58] Field of Search ........... 106/288 Q, 308 Q, 308 M

[56] References Cited

U.S. PATENT DOCUMENTS

| | | | |
|---|---|---|---|
| 3,159,498 | 12/1964 | Davis et al. | 106/288 Q |
| 3,635,745 | 1/1972 | Rentel et al. | 106/288 Q |
| 3,925,094 | 12/1975 | Papenfuss et al. | 106/288 Q |
| 4,032,357 | 6/1977 | Rees et al. | 106/288 Q |
| 4,285,994 | 8/1981 | Pearce et al. | 106/308 Q |
| 4,373,962 | 2/1983 | Iyengar | 106/288 Q |
| 4,383,865 | 5/1983 | Iyengar | 106/288 Q |

Primary Examiner—Helen M. McCarthy
Attorney, Agent, or Firm—Bernhard R. Swick

[57] ABSTRACT

It has been discovered in accordance with the instant invention that a process which combines a relatively low temperature heat treatment of precipitated Alkali Blue slurry with subsequent freeze drying of the presscake yields a product which exhibits superior tinting strength and dispersion properties as well as excellent texture.

15 Claims, No Drawings

SOFT TEXTURED HIGH STRENGTH ALKALI BLUE PIGMENT

BACKGROUND OF THE INVENTION

1. Field of the Invention

This invention relates to a pigment composition and to a process for its manufacture. More particularly the invention relates to an improved Alkali Blue, preferably E. D. Alkali Blue, pigment composition characterized by soft texture, high tinting strength and ease of dispersion when dispersed in oleoresinous vehicles and to a process for its manufacture.

2. Description of the Prior Art

"Alkali Blue" is generally known in the art as, and is used herein to define, an arylpararosaniline sulfonic acid of the general formula

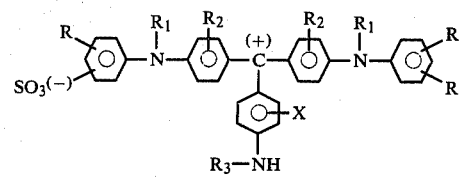

wherein R may be hydrogen, chlorine, bromine, alkyl containing from 1 to 4 carbon atoms, alkoxy containing from 1 to 4 carbon atoms, nitro-, amino-, sulfonamide-alkylamino containing from 1 to 4 carbon atoms, $R_1$ and $R_2$ may be hydrogen, or alkyl containing from 1 to 4 carbon atoms, $R_2$ may be hydrogen or phenyl with or without a grouping such as R and X may be hydrogen, chlorine, bromine, $SO_3H$ or $COOH$.

Due to the strongly polar hydrophilic property of the pigments represented by the above general formula, moist press cakes of these pigments, upon drying, tend to form hard agglomerates and aggregates. Additionally, the extremely fine particle size of the pigment with the resulting hydrogen bonding at the surface makes it extremely difficult to produce ink paste suitable for use in printing by employing the three-roll mill dispersion of the dry pigment into vehicles imparted for that purpose. The difficulties which are associated with the dispersion of thermally dried Alkali Blue press cakes are well known to those skilled in the art and having also been disclosed in various publications, e.g., E. K. Fischer, Am. Inkmaker 23 (1945) No. 12 and T. C. Patton, Editor, Pigment Handbook, Vol. 1, page 620.

As a result of the difficulties associated with the dispersion of the dry Alkali Blues for technical use, other methods have been developed suitable for use in, e.g., the printing ink industry. One of these is called the "flush process." In this process the water wet pigment in the press cake is transformed to an oil wet product by kneading in a double arm mixer with the desired vehicle. The water which separates out is drained off and the "flush" is subjected to vacuum treatment or transferred to a roll mill and milled until the remaining residual water has been evaporated. The flush paste is then ready for use directly in ink formulations. The product thus produced usually contains from 35 to 40 percent by weight of the pigment.

In order to prepare large quantities of pigment by the flushing procedure, large size kneading machines working discontinuously are necessary which results in high manufacturing costs. The high vehicle content (60 to 65 percent by weight) in the pigment paste made by the flushing procedure leads to other difficulties associated with compatibility with other ink vehicles for various end uses and in the balancing of properties such as color strength, viscosity, tack, etc. at the required concentration levels in the formulated inks.

As a result, numerous attempts have been made to manufacture more concentrated pigment compositions which can be used in a wide variety of applications. Pigment preparations (containing 10 to 70 percent by weight of natural or synthetic acidic resins) which can be dried and converted into readily dispersible pigment powders with high tinctorial strength and grain softness have been reported.

U.S. Pat. No. 3,925,094 teaches the preparation of dyestuffs by employing resin acids in order to obtain pigments with good dispersion and high strength. U.S. Pat. No. 3,635,745 teaches the preparation of dyestuffs by treating alkaline solutions of the pigment with an aqueous alkaline solution of resinic acids or the acid modified products thereof. U.S. Pat. No. 3,159,498 discloses the freeze-drying of aqueous pigment dispersions including presscakes. Alkali Blue pigments are listed among those that can be freeze dried according to this patent.

In recent years considerable improvement in texture has been effected in the so-called "E. D. Alkali Blues" which are currently very popular as toners for carbon black inks and in carbon paper applications. Texture improvement in such products is generally brought about by incorporating appropriate amounts of resins and/or additives to a caustic solution of the pigment and subsequently heat treating the coprecipitated slurry at or close to boiling for a specified period of time.

U.S. Pat. No. 4,032,357 discloses an easy dispersing Alkali Blue type pigment product produced by a process which includes subjecting a water-containing mass of the pigment to a heat treatment step at a temperature of from about 60° C. to about 120° C. However, the patent does not disclose freeze drying. In general, heat treatments at lower temperatures that maximize strength lead to products with unacceptable texture and treatments at relatively higher temperature or for longer periods of time that improve texture, show a reduction in the ultimate strength of the product.

SUMMARY OF THE INVENTION

It has been discovered in accordance with the instant invention that a process which combines a relatively low temperature heat treatment of precipitated Alkali Blue slurry with subsequent freeze drying of the presscake yields a product which exhibits superior tinting strength and dispersion properties as well as excellent texture.

DESCRIPTION OF THE PREFERRED EMBODIMENT

In accordance with the instant invention, a soft textured, high strength Alkali Blue pigment characterized by ease of dispersion is produced by a low temperature heat treatment of an Alkali Blue slurry at a temperature of about 80° C. to 98° C. for a period of up to about 15 minutes. There is no minimum time for holding at the maximum temperature since the heat treatment is effective even when the slurry is cooled immediately after reaching the desired temperature. The slurry generally is an aqueous slurry of freshly precipitated Alkali blue pigment, having a pH of less than 1.0 and contains 3 to 10 percent by weight of the Alkali Blue on a dry basis. The slurry is a conventional slurry which results from conventional well known processes for manufacturing Alkali Blue. In one such method, a crude Alkali Blue is produced by phenylation with analine of parafuchsin, followed by sulfonation with sulfuric acid and subsequent drowning in water after which it is dissolved in aqueous sodium hydroxide and reprecipated with a mineral acid thereby producing the Alkali Blue slurry described above which is subjected to the low temperature heat treatment and subsequent freeze drying of the resulting presscake in accordance with the instant invention. The presscake preferably contains about 15 to 30 percent by weight solids.

The slurry to be treated in accordance with the instant invention may also be obtained from an Alkali Blue pigment in the form of a regular, untreated presscake made from reprecipitating crude Alkali Blue from a caustic solution using a mineral acid to obtain pigmentary properties, filtered and washed after which it is dissolved into water containing sodium hydroxide or other alkali metal hydroxide in amount sufficient to obtain a pH of 9 to 13, preferably 12 to 13 wherein sufficient stirring and heat is provided to obtain a deep brown colored solution. Alkali Blue is reprecipitated in the temperature range of 60° C. to 80° C. from the brown (caustic) solution with sufficient mineral acid to obtain a pigment slurry with a pH of <1.0.

In accordance with a preferred embodiment of this invention, Alkali Blue pigment is resinated by co-precipitating the Alkali Blue with a suitable resin during production of the slurry and prior to the heat treatment of the slurry. Suitable resins include high acid resins, pentalyn resins, wood rosins, etc. The resins may be both natural resins and synthetic resins and modification products thereof.

By "resins" there are to be understood natural resins, for example balsam resin, root or tall resin, their oxidation products formed by exposure to air and mixtures thereof, as well as synthetic resins, for example hydrocarbon resins and modification products.

"Modification products" are herein meant to be known derivatives of the above compounds which have already been described in the art and which include the following:
1. Oxidized resin acids,
2. Hydrogenated resin acids (cf. U.S. Pat. No. 2,174,651)
3. Dimerized resin acids (cf. U.S. Pat. No. 2,124,675),
4. Disproportioned resin acids,
5. Acid resin esters with mono-, di- and/or polyfunctional alcohols or mixtures thereof or products obtainable by the reaction of resin acids with epoxy resins or ethylene oxide,
6. Aldehyde-modified resins obtained by the addition reaction of, for example, formaldehyde or other suitable aldehydes with resins or further condensates of the aldehyde-modified resins with phenols or formaldehyde and phenols (cf. U.S. Pat. Nos. 1,658,828 and 2,007,983) and reaction products obtained by oxonation or hydroformylation of resins (cf. U.S. Pat. No. 2,327,066),
7. Acid maleinate resins and other products obtained by the reaction of dienes with resins, for example adducts of levopimaric acid-maleic acid anhydride, addition products of maleic or fumaric acid with resins or resin esters manufactured by means of acrylic acid,
8. Phenol-modified resins which are obtained under the action of strongly acid or acid-separating catalysts by the addition reaction of phenols with resins and which contain not only free acid groups but also phenolic hydroxyl groups which may (partially) be esterified,
9. Adducts of resin with hydrocarbons containing double bonds which have been obtained in the presence of strongly acid compounds, such as boron trifluoride. Hydrocarbons of this kind are for example butadiene, isoprene, isobutene, cyclopentadiene, styrene, methyl and vinyl styrene, cumarone, indene and carbazole (cf. U.S. Pat. Nos. 2,527,577, 2,527,578, and 2,532,120),
10. Resin-modified acid phenol resins, manufactured by the reaction of resins with phenolaldehyde, preferably phenol, alkyl phenol or aralkyl phenol-formaldehyde condensates or mixtures thereof. The manufacture of the phenol-formaldehyde-condensates may have been carried out under the action of alkaline condensation agents, preferably those having more than 1 mol of aldehyde per mol of phenol and under the action of acid condensation agents having less or more than 1 mol of formaldehyde. It may have also been possible to have the resins condensed with phenols, aldehydes and catalysts together,
11. Acid resin condensates with xylene formaldehyde resins,
12. Resin condensates with terpene-maleic resins, which are known, for example, under the name of Petrex (registered trademark) (cf. E. R. Littmann, Ind. Engng. Chem. 28, 1150 (1936).

The amount of such resins is from about 2 to 40 and preferably between 15 and 25 weight percent based on the weight of the finished pigment on a dry basis.

Subsequent to the heat treatment described above, the slurry is filtered, preferably through a conventional filter press, washed, and the washed presscake with a total solids content of from 15 to 30 percent by weight is then freeze dried.

In freeze drying technique, the water is not removed while in the liquid phase. Instead, a presscake or dispersion of pigment particles in water is frozen so that each individual pigment particle is separated from adjacent ones by water in the solid phase, i.e. ice. The pigment particles are no longer movable but are locked in position. Hence, each pigment particle is kept separate by the ice and is removed by sublimation with each molecule of water coming from a solid surface.

For pure water the triple point, that is, the point at which water in the liquid phase, ice in the solid phase, and water in the vapor phase, can concurrently exist is a pressure of 4.57 mm and a temperature of 0.008° C. If the partial pressure of water vapor is kept below 4 mm of mercury at all points of this systems, for a pure water system, the water would sublime from the solid phase to the vapor phase without ever going through the liquid phase.

In the present pigment drying systems, at least some of the liquid phase may be other than water. For example, the liquid phase may consist of pure water, or a mixture of water and an alcohol, or water and acetone, or of water containing minor proportions of synthesis solvents or materials. If such mixtures has a lower freezing point than that of water alone, the temperature of the subliming mass must be lower than that used when water alone is the liquid phase, and must, in fact, be sufficiently low that the solvent is maintained in the solid phase.

In a typical Alkali Blue drying operation, the freezing of the presscake (15 to 30 percent solids) is carried out in the range of $-30°$ C. to $-40°$ C., preferably at $-40°$ C. The reduced pressure inside the system during the freeze drying depends on the temperature at which the drying is carried out. In order to accomplish this, a condenser and pump system is provided. In other words, enough vacuum is provided to achieve the desired temperature, i.e., $-30°$ C. to $-40°$ C. The freeze drying is carried out in conventional equipment which generally comprises a single stage, mechanically refrigerated unit with a corrosion resistant vapor condensing module capable of obtaining a temperature as low as $-54°$ C. coupled with a tray drying chamber with several hollow shelves wherein the temperature controlled heat transfer fluid is circulated. The temperature of the trays can be set in the range of $-40°$ C. to $+50°$ C. during drying. Thus, the material placed in the shelves can be frozen at a lower temperature and subsequently dried by carefully raising its temperature in a vacuum to remove water vapor. The rate of water vapor removal is directly dependent on the temperature at which the drying is carried out. The water vapor removed condenses in the cooling coils of the base freezer dryer. Thus the refrigeration as well as the drying of the presscakes is accomplished in the trays and vacuum and vapor collection is effected by the freeze drier part. Equipment of this type is easily available on the market. In a typical Alkali Blue drying operation, the freezing is carried out in the range of $-30°$ C. to $-40°$ C., as stated above, preferably at $-40°$ C., while the drying is accomplished in the range of $-30°$ C. to $0°$ C., preferably between $-5°$ C. to $0°$ C. The time required for freezing the presscake and its subsequent drying depends on factors such as (a) the amount of presscake used, (b) the water content in the presscake, (c) the temperature at which the freezing is carried out, and (d) the temperature and degree of vacuum at which the sublimation of water occurs. In a preferred embodiment the freezing of 6 to 7 Kg of an Alkali Blue presscake would normally take between about 4 and 8 hours and the drying would require a period of about 12 and 24 hours.

In place of the conventional mechanical refrigeration (for freezing the water in the presscake), in some cases the so-called vacuum cooling technique can be used. This technique calls for removing 2 to 3 percent total water by vacuum application. The latent heat (597 cal/gm at $0°$ C.) of the evaporating water produces sufficient cooling that the remaining water in the presscake freezes to ice which is subsequently removed in the usual way under vacuum at low pressure.

The effect of surface active agents on the dispersibility of pigments is considerable. Even though the surface active agents have a marked influence, where other conditions are constant, the freeze drying of the pigment gives a stronger pigment than if heat drying is used. The surface active agents may be nonionic agents such as the condensation product of nonylphenol with ethylene oxide. The amount of ethylene oxide may range from about 5 to 30 moles of ethylene oxide. Other alkylaryl polyether alcohols containing from 4 to 12 carbon atoms in the alkyl group and about 4 to about 20 moles of ethylene oxide may also be employed. The polyethylene glycol trioethers reacted with various phenols having alkyl groups of from 8 to 13 carbon atoms attached to the phenol ring may be employed as well as the ethylene oxide condensates with polyoxypropylene such as those disclosed in U.S. Pat. Nos. 2,674,619, 2,677,700 and 3,036,118.

Anionic agents may also be employed such as alkyl sulfonates or alkylaryl sulfonates. The nonionic and anionic agents may be added to the caustic solution prior to precipitation or to the pigment slurry after precipitation.

As specific embodiments and illustrative of the present invention, certain specific examples are set forth below. In the instant application all parts are by weight and all temperatures are in degrees centigrade unless otherwise specified.

EXAMPLE 1

(Preparation of the standard)

410 parts of a 24.2 percent aqueous presscake of Alkali Blue (99.2 parts of dyestuff) consisting principally of triphenylpararosanilinemonosulfonic acid were stirred with 600 parts water and 10 parts of sodium hydroxide and the mixture heated to boil for 10 minutes with constant stirring. The pH of the slurry was 12.8 at room temperature.

To this was added a caustic solution of 24.8 parts of a fumaric-modified wood rosin ester. The mixture (at $60°$ C.) was then run into a solution of 43 parts of hydrochloric acid (as 37 percent), and 1000 parts of water also maintained at $60°$ C. to coprecipitate the color and resin. The slurry was heated to $95°$ C. (5 minutes) and flooded with cold water back to $60°$ C., filtered, and the pigment washed and oven dried at $60°$ C.

EXAMPLES 2-4

A 15 kilogram batch of Alkali Blue slurry coprecipitated with Filtrez 591 resin was prepared as described in Example 1 using the proportions set forth therein.

The slurry was stirred for 15 minutes, heated to $90°$ C. and immediately cooled to $60°$ C. with water. The slurry was then filtered and washed free of salts. A 2000 gram portion thereof was finished as a dry toner by drying at $140°$ F. ($60°$ C.) in an oven and grinding in small amounts from lumps prior to testing.

A second 6000 gram portion of the presscake was freeze dried as described above in an apparatus marketed by FTS Systems, Inc., P.O. Box 158, Route 209, Stoneridge, N.Y. 12484, consisting of a single-stage mechanically refrigerated freezer-drier identified as FD-20-54-VP and a tray drying chamber fitted with a stainless steel Taper Lock TM shelf assembly sold under the designation TD-5-935. More specifically, the apparatus consisted of a single-stage mechanically refrigerated unit with a corrosion resistant vapor condensing module capable of attaining a temperature of $-54°$ C. The temperature of the trays can be set in the range of $-40°$ C. to $+50°$ C. during drying. The freezing operation was begun at $-40°$ C. and required a period of about 12 hours, followed by the drying at $-5°$ to $0°$ C. over a period of 24 hours.

A third 5000 gram portion of the presscake was dried in a spray dryer having an inlet temperature of $240°$ C. and an outlet temperature of $120°$ C.

The three products made starting from the presscake heat treated at $90°$ C. were compared with each other and with the standard of Example 1 for ultimate strength and ease of dispersion in two different conventional vehicle systems designated Vehicle #1 and Vehicle #2. A summary of these results is shown in Table I set forth below. Using Vehicle #1, the ease of dispersion is determined by mixing 0.1 gram of the dried pigment with 5 grams of a white paste containing ca. 40 percent of zinc oxide in a heat set type lithographic varnish. The mixture is then hand spatulated on a clean Hoover Muller plate to wet the pigment, and is spatulated until uniform. The sample is then mulled for 25 revolutions with the fixed weight (~2500 grams) on the Hoover Muller. The plates are scraped and the operation repeated. The plates are scraped again and one-fourth of the sample is removed and set aside for later comparison. This one-fourth of the sample is generally designated 2×25 and is indicated under "Ease of Dispersion" in Vehicle #1 (Table I) by the columnar heading "2." The remainder of the sample is mulled for another 25 revolutions with a single weight on the Hoover muller, scraped and mulled again. The plates are then scraped again, and one-third of the remaining sample is removed and set aside which is designated 4×25 and is indicated under Vehicle #1 in Table I under the columnar heading "4." The remainder is then mulled twice again as with the two previous batches and one-half of the remaining sample is removed and set aside which is designated 6×25 and indicated in the Table under Vehicle #1 by the columnar heading "6." The above describes the dispersion tests made in Vehicle #1.

The remaining half of the last sample is then employed for determining the "ultimate strength" by mulling this portion on the Hoover muller with all the Hoover muller weights (~7500 grams) three times at 50 revolutions each. That is to say it is mulled for 50 revolutions, all the samples scraped off the plate, mulled for 50 revolutions again, all the samples again scraped off the plate, and finally mulled a third time for 50 revolutions. This sample is designated the ultimate and the values are set forth in Table I under the heading "Ultimate Strength." The "Ease of Dispersion" tests set forth in the columns headed by Vehicle #2 were performed in the same manner except that a second vehicle containing ~50 percent TiO$_2$ in a proprietary oleoresinuous vehicle was employed for the test.

The samples obtained from each of Examples 2, 3 and 4 are compared with Example 1 as a standard in each case. The numerical values shown in the table are obtained by a series of comparisons of each example with the standard whereby when the color is stronger than the standard, the white paste in Vehicle #1 described above is added to dilute the sample of the Example in increments after which each dilution is checked against the standard by drawdown until the strength is the same as the standard. The percentage of pigment in the diluted sample is then determined and the difference between that percentage and 100 is indicated as the number followed by the indication str. For example, the Ultimate Strength sample of Example 3 had to be diluted down to the point where the amount of pigment was 93 percent of that in the standard. Ninety-three is then subtracted from 100 to give seven, which is the number shown in the table, followed by the str. This means that it is 7 percent stronger than the standard. Where the sample is obviously weaker than the standard, more pigment is added until color strength is equal to the standard. The percentage of pigment as compared to the percentage in the standard is then determined. For example, with Example 2 this was 106 percent for the Ultimate Strength, and it is indicated in the Table as 6 parts wk.

This same testing and numerical system applies also to the numbers shown in the "Ease of Dispersion" columns. For example, 50 str means that it took only half as much pigment to obtain the same strength as obtained in the standard, and 25 wk meant that it required 25 percent more pigment to achieve the same strength as the standard. The ease of dispersion can then be determined by the numbers under the "Ease of Dispersion" column comparing the strength of each example for two passes against that of six passes. The closer the strength value of two passes is to that for six passes, the more easily dispersed the material is. For example, where the values for two passes and six passes are identical, it is fully dispersed in two passes. The "Ease of Dispersion" numbers such as those for Example 3 merely mean that the strength after two passes was 50 percent stronger than the standard was after two passes and was still 50 percent stronger after six passes than the standard was after six passes. It does not mean that the values are the same in absolute terms. If you compare these with the "Ultimate Strength" values, Example 3 is only 7 percent stronger than the standard after three more passes of 50 revolutions each. This indicates that while the ultimate strength is only 7 percent better, the initial strength is 50 percent better which, in other words, means that it disperses much faster than the standard.

TABLE I

| Example No. | Ultimate Strength Vehicle #1 | Ease of Dispersion | | | | | |
|---|---|---|---|---|---|---|---|
| | | Vehicle #1 Passes | | | Vehicle #2 Passes | | |
| | | 2 | 4 | 6 | 2 | 4 | 6 |
| 1 Standard | Std | Std | Std | Std | Std | Std | Std |
| 2 Plant Oven Dried | 6 parts wk | 25 wk | 25 wk | 25 wk | 10 str | 8 wk | 7 str |
| 3 Freeze Dried | 7 parts str | 50 str | 50 str | 50 str | 15 str | Eq. | Eq. |
| 4 Spray Dried | Eq. str | 60 wk | 60 wk | 60 wk | 20 wk | 10 wk | 2 str |

EXAMPLES 5–11

A sample of resinated Alkali Blue was precipitated as described in connection with Examples 1–4 and heat treated at 95° C. (no holding) and processed in the manner also as described in Examples 1–4 above and the resulting presscake divided into two portions. One portion was oven dried at 140° F. and the other was freeze dried in a laboratory apparatus sold by the Vertis Company of Gardiner, N.Y., Model No. 10-117. The samples were tested for ultimate strength and dispersion properties, and the results are shown in Table II below, identified as Examples 5 and 6. Another sample of slurry obtained as described in Examples 1–4 was boiled for 5 minutes, the boiling temperature being about 100° C. One portion was oven dried at 140° F. while the other portion was freeze dried in the Vertis apparatus employed with Examples 5 and 6. These were tested for ultimate strength and dispersion properties, and the results are shown in Table II below, indicated as Examples 7 and 8. A further sample of slurry obtained as described in Examples 1-4 was boiled for 15 minutes and divided into two portions. One portion was oven dried at 140° F. and the other was freeze dried as set forth in Examples 1-4. Ultimate strength and texture properties are shown in Table II below and designated as Examples 9 and 10. Results for Examples 5-10 are compared with a standard prepared as described in Example 1 and indicated in Table II below as Example 11.

For Examples 5 to 11 the ultimate strength was determined as set forth with respect to Examples 1-4.

The ease of dispersion was tested in the same manner as described with respect to Examples 1-4, but the results are shown only in terms of the percentage increase in strength from two passes to four passes and from four passes to six passes at 25 revolutions in the Hoover muller machine. More specifically, the percent of change between two passes and four passes of 25 revolutions each and also the percent of change between four passes and six passes of 25 revolutions each is shown in Table II.

From Table II it can be seen that the Ultimate Strength of all the freeze dried samples was substantially equal to or superior to the oven dried samples and all were superior to the standard. All the freeze dried samples had superior ease of dispersion since there was very little change between two and four passes and between four and six passes, whereas there was substantial change with the oven dried samples. Also it can be seen that the best results were obtained by heating the slurry to 95° C. followed by immediate cooling before freeze drying.

TABLE II

Effect of Freeze Drying on Use Properties of 7090 Pigments

| Example | Slurry Treatment | Drying Method | Ultimate Strength | Ease of Dispersion Passes | |
|---|---|---|---|---|---|
| | | | | 4 vs 2 | 6 vs 4 |
| 5 | 95° C. | Oven Dried at 140° F. | 20 str. | +12 | +7 |
| 6 | " | Freeze Dried | 26 str. | +1 | Eq. |
| 7 | Boil Slurry for 5 min. | Oven Dried at 140° F. | 12 str. | +8 | +5 |
| 8 | Boil Slurry for 5 min. | Freeze Dried | 12 str. | +1 | Eq. |
| 9 | Boil Slurry for 15 min. | Oven Dried at 140° F. | 5 str. | +5 | −1 |
| 10 | Boil Slurry for 15 min. | Freeze Dried | 4 str. | Eq. | −1 |
| 11 | — | — | Std. | +1 | −1 |

Having thus described the invention, what is claimed is:

1. A process for preparing a soft textured high strength resinated Alkali Blue pigment composition characterized by ease of dispersion consisting essentially of subjecting a precipitated resinated Alkali Blue slurry containing about 3 to 10 percent by weight Alkali Blue on a dry basis to a heat treatment at 80° C. to about 98° C. for a period of up to about 15 minutes, filtering said slurry to produce a presscake containing about 15 to 30 percent by weight solids on a dry basis, and freeze drying the presscake.

2. The process of claim 1 wherein said pigment and the resin are coprecipitated to form said slurry.

3. The process of claim 1 wherein said Alkali Blue pigment is treated with an anionic or nonionic surfactant.

4. The process of claim 2 wherein said Alkali Blue pigment is treated with an anionic or nonionic surfactant.

5. The process of claim 1 wherein said heat treatment comprises heating to a temperature of about 90° to 98° C.

6. The process of claim 2 wherein said heat treatment comprises heating to about 90° to 98° C.

7. The process of claim 3 wherein said heat treatment comprises heating to a temperature of about 90° to 98° C.

8. The process of claim 4 wherein said heat treatment comprises heating to a temperature of about 90° to 98° C.

9. The process of claim 1 wherein said heat treatment comprises heating to a temperature of 80° to about 98° followed by immediate cooling.

10. The process of claim 2 wherein said heat treatment comprises heating to 80° to about 98° C. followed by immediate cooling.

11. The process of claim 3 wherein said heat treatment comprises heating to a temperature of 80° to about 98° C. followed by immediate cooling.

12. The process of claim 4 wherein said heat treatment comprises heating to a temperature of 80° to about 98° C. followed by immediate cooling.

13. A soft textured, high strength Alkali Blue pigment; characterized by ease of dispersion properties greatly superior to those achieved by heat treatment of the same pigment slurry, filtering and heat drying of the presscake; produced by the process of claim 1.

14. A soft textured, high strength Alkali Blue pigment; characterized by ease of dispersion properties greatly superior to those achieved by a heat treatment of the same pigment slurry, filtering and heat drying of the presscake; produced by the process of claim 6.

15. A soft textured, high strength Alkali Blue pigment; characterized by ease of dispersion properties greatly superior to those achieved by a heat treatment of the same pigment slurry, filtering and heat drying of the presscake; produced by the process of claim 4.

* * * * *